United States Patent
McGuire, Jr. et al.

(10) Patent No.: US 9,856,568 B2
(45) Date of Patent: Jan. 2, 2018

(54) SYSTEM TO VERIFY ROD ANODE INTEGRITY

(71) Applicant: Ecosphere Technologies, Inc., Stuart, FL (US)

(72) Inventors: Dennis McGuire, Jr., Stuart, FL (US); James T. Thomas, Stuart, FL (US); Anthony W. Baldwin, Stuart, FL (US)

(73) Assignee: Ecosphere Technologies, Inc., Stuart, FL (US)

( * ) Notice: Subject to any disclaimer, the term of this patent is extended or adjusted under 35 U.S.C. 154(b) by 401 days.

(21) Appl. No.: 14/627,874

(22) Filed: Feb. 20, 2015

(65) Prior Publication Data
US 2015/0233782 A1    Aug. 20, 2015

Related U.S. Application Data

(60) Provisional application No. 61/942,470, filed on Feb. 20, 2014.

(51) Int. Cl.
| C25B 15/02 | (2006.01) |
| C25B 11/02 | (2006.01) |
| C02F 1/467 | (2006.01) |
| C02F 1/461 | (2006.01) |
| G01M 3/32  | (2006.01) |
| C02F 1/46  | (2006.01) |

(52) U.S. Cl.
CPC ............. *C25B 15/02* (2013.01); *C02F 1/46* (2013.01); *C02F 1/467* (2013.01); *C02F 1/46104* (2013.01); *C25B 11/02* (2013.01); *G01M 3/3272* (2013.01); *C02F 2001/46171* (2013.01)

(58) Field of Classification Search
CPC ......... C02F 2001/46171; C02F 1/463–1/4672; C02F 1/4676–1/4678; C02F 1/461–1/46109; C25B 15/02; G01M 3/3272
See application file for complete search history.

(56) References Cited

U.S. PATENT DOCUMENTS

2010/0320147 A1* 12/2010 McGuire ............ E21B 43/26
                                                           210/638

* cited by examiner

*Primary Examiner* — Nicholas A Smith
(74) *Attorney, Agent, or Firm* — McHale & Slavin, P.A.

(57) ABSTRACT

A pressurized rod anode having a hollow core that is monitored by a sensor. The hollow core is pressurized at all times, or in the alternative, is of a pressure less than the pressure within a reactor tank. A rod anode that fails to maintain pressure indicates material removal sufficient to breach the integrity of the rod anode. A relay can be used to cause removal of the rod anode power source when a breach of integrity occurs. Indicator lights provide instant monitoring of the rod anode condition, a bypass switch allow temporary operation of a rod anode pending a timed shutdown for repair.

10 Claims, 4 Drawing Sheets

SYSTEM TO VERIFY ROD ANODE INTEGRITY

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 61/942,470, entitled "PRESSURE ROD ANODE", filed Feb. 20, 2014. The contents of the above referenced application is incorporated herein by reference.

FIELD OF THE INVENTION

This invention is directed to the field of rod anodes and in particular to an apparatus and method of monitoring the integrity of a rod anode.

BACKGROUND OF THE INVENTION

Traditional rod anodes are effective in process solutions such as electro oxidation, also referred to as electro coagulation and/or electro flocculation. However, rod anodes are only effective if there is sufficient material to properly operate as an anode. For instance, when a rod anode is placed within a sealed tank it is not possible to determine the integrity of the rod until failure. If the anode is not changed before failure, the effectiveness of the electro oxidation process can be diminished or lost. Further, if the anode is not operating properly the fittings or even the tank is as risk of damage. When rod failure occurs in the form of breakage, pieces of broken rod anode can collide with other rods causing additional failures. Further, rod anode pieces can travel to other parts of the system which can result in cascading failures and costly repairs. Maintenance of the anode requires the system to be shut down, tanks drained, and the anodes visually inspected. If failure occurred, downstream components will also have to be inspected to assure the components are removed so further damage does not occur.

Loss of the rod anode can leave an exposed power source if full voltage and current continues to flow to the now lost anode. This is of particular concern in high flow/high pressure reactor applications wherein degradation of the rod anode can lead to catastrophic failure resulting in a release of anode debris. High TDS fluid can place a further stress on the rod anode requiring replacement of even slightly damaged anode due to the high stress environment. This is a particular problem for portable equipment that may be used on varying fluid supplies. In such instances it may not be possible to predict anode replacement time causing an increase in labor and down time to inspect the anodes.

What is needed in the industry is an apparatus and method of monitoring the integrity of rod anodes.

SUMMARY OF THE INVENTION

Disclosed is a rod anode having a hollow core. During operation, the core can be either pressurized using a pressure switch to monitor any change in the pressure introduced to determine integrity of the rod anode. Should the rod anode fail to maintain pressure, a sufficient amount of material has been lost causing a breach in the rod anode. Upon loss of pressure, a signal to the rod anode power source is removed. Alternatively, the rod can be devoid of pressure when used in a pressurized tank environment. In this embodiment a pressure switch is activated should pressure enter the core.

An objective of the instant invention is to monitoring system for use in combination with a hollow rod to determine rod anode integrity.

Still another objective of the instant invention is to provide a system so that when a rod anode failure does occur, power is disengaged to prevent further degradation of the rod anode which can cause cascading failures within the system.

Still another objective of the instant invention is to provide a user friendly monitoring system of red and green lights to determine if a rod anode failure has occurred.

Another objective of the instant invention is to provide a monitoring system that includes a bypass switch wherein the system can be operated until a process is concluded.

Other objectives and further advantages associated with this invention will be apparent to those skilled in the art from the description, examples and claims which follow.

DETAILED DESCRIPTION OF THE PREFERRED EMBODIMENT

An embodiment of the instant invention is disclosed herein, however, it is to be understood that the disclosed embodiment is merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the Figures, disclosed is a reactor tank for receipt of fluid from a source "A" by use of a conventional transfer pump 12. In particular, this invention is directed to the type of reactor tank disclosed in U.S. patent application Ser. No. 12/765,971, the content of which are incorporated in its entirety herein. In this regard, the rod anodes are positively charged with direct current and operate as electrodes designed to release power into the effluent. The anode electrodes help to generate hydroxyl radicals from oxygen molecules thereby facilitating the breakdown of contaminants in the fluid at a faster rate. Such anodes are susceptible to a high amount of stress when the tank includes advanced oxidation elements such as those desired when using a tank system for recycling of produced water. Fluid passed through the reactor tank 10 is treated fluid "B" that is forwarded to additional processes, not shown. A typical reactor tank is used for electro-oxidation, also referred to as electro coagulation and/or electro flocculation. The reactor tank depicted is a continuous flow through with a cathode mesh basket 18 operating as a negatively charged cathode. A water jacket cooled gland nut 24 is used for isolating the rod anode.

Figure 4:
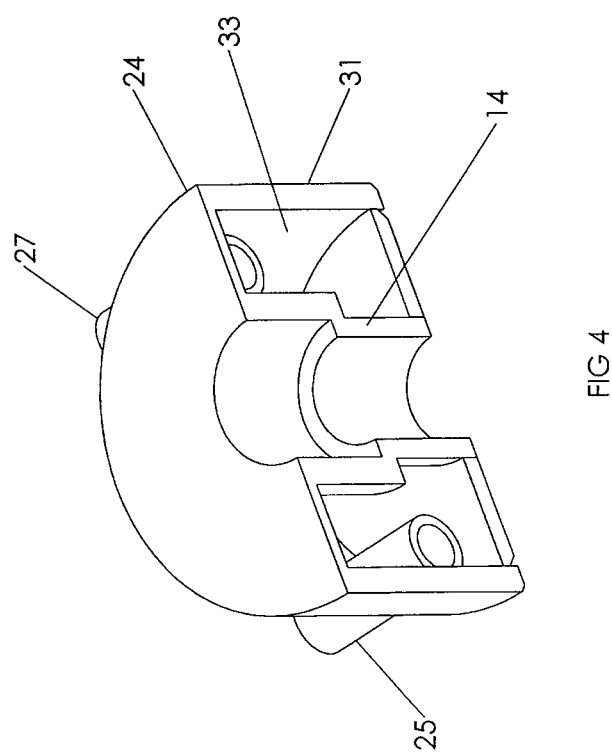
FIG. 4 is a cross sectional view of the gland nut.

The purpose of the rod anode 14 is for receipt of a direct current electrical charge wherein the rod anode 14 is positive charged and a mesh basket 18 positioned around the rod anode 14 is negatively charged 20. The preferred rod anode 14 includes a titanium substrate that is plated. A pressurized rod anode 14 of the instant invention is based upon ¾" tubing having an O.D. of about 0.75", an I.D. of about 0.652", and a wall thickness of about 0.049" forming a hollow core or interior chamber 15. A solid bull nose 22 is formed along a distal end and the water jacket cooled gland nut 24 forms a solid threaded connection point with an air channel for securement to an air line 26 at the opposite end. A chilled water recirculating cooling system 23 is fluidly coupled to the water jacket cooled gland nut 24 to address the high heat produced at the gland nut. As shown in FIG. 4, the water jacket cooled gland nut 24 has an inlet 25 and outlet 27 coupled to a jacket housing 31 securable to the chilled water cooling system 23. The jacket housing 31 includes an interior chamber 33 that allows the cooling fluid to engage the anode connection point for cooling the anode at the highest heat concentration area. The rod anode parts are preferably press fit, welded and machined smooth. Polyethylene tubing is used to keep the pressurized air or non-conductive water isolated from the direct current.

The air line 26 is monitored by a sensor switch 28 for determining pressure within the rod core. The sensor 28 includes a green indicator light 30 that is illuminated to indicate that rod anode 14 is maintaining air pressure. A red light 32 indicates that the rod anode 14 is unable to maintain pressure such as during a failure shown by breach 29. In one embodiment the sensor can have a first predetermined pressure point to indicate the rod is holding pressure wherein the operating light indicates the rod is holding pressure. Should the pressure fall below the first predetermined pressure point an indicator light can depict a breach of the rod. A second predetermined pressure point can be used to deenergize power to the rod anodes. In an alternative embodiment the sensor can have a first predetermined pressure point to indicate the rod is holding pressure wherein the operating light indicates the internal section of the rod is not in receipt of pressure. Should pressure be introduced into the rod, the first predetermined pressure point can be activated to depict a breach of the rod. A second predetermined pressure point can be used to deenergize power to the rod anodes should pressure within the rod exceed the preset level.

A control relay 36 operates in conjunction with the sensor 28 to stop control items based upon instructions received from the PLC controller 38. The control relay 36 primarily operates the DC power source 40 to discontinue DC positive 16 current to the rod anode. DC negative 18 is grounded to the reactor tank 10. While a simple schematic is depicted, it should be noted that the system is capable of operating a plurality of rod anodes and that one or multiple rods could be disabled to allow prolonged operation of the unit between inspections. In this manner the breached rod anode can be isolated so that continued degradation will not occur while the treatment system continues to operate.

A bypass switch 34 allows operation of the system until a treatment process can be concluded. For instance, if a breach in the rod anode does occur, the breach does not mean that the anode has failed but rather that the anode is failing. This allows the system to continue operation until the unit can be shut down for service. That is, the conventional transfer pump 12 turned off and the reactor tank 10 drained. The rod anode 14 can then be pulled from the tank and exchanged.

Figure 1:
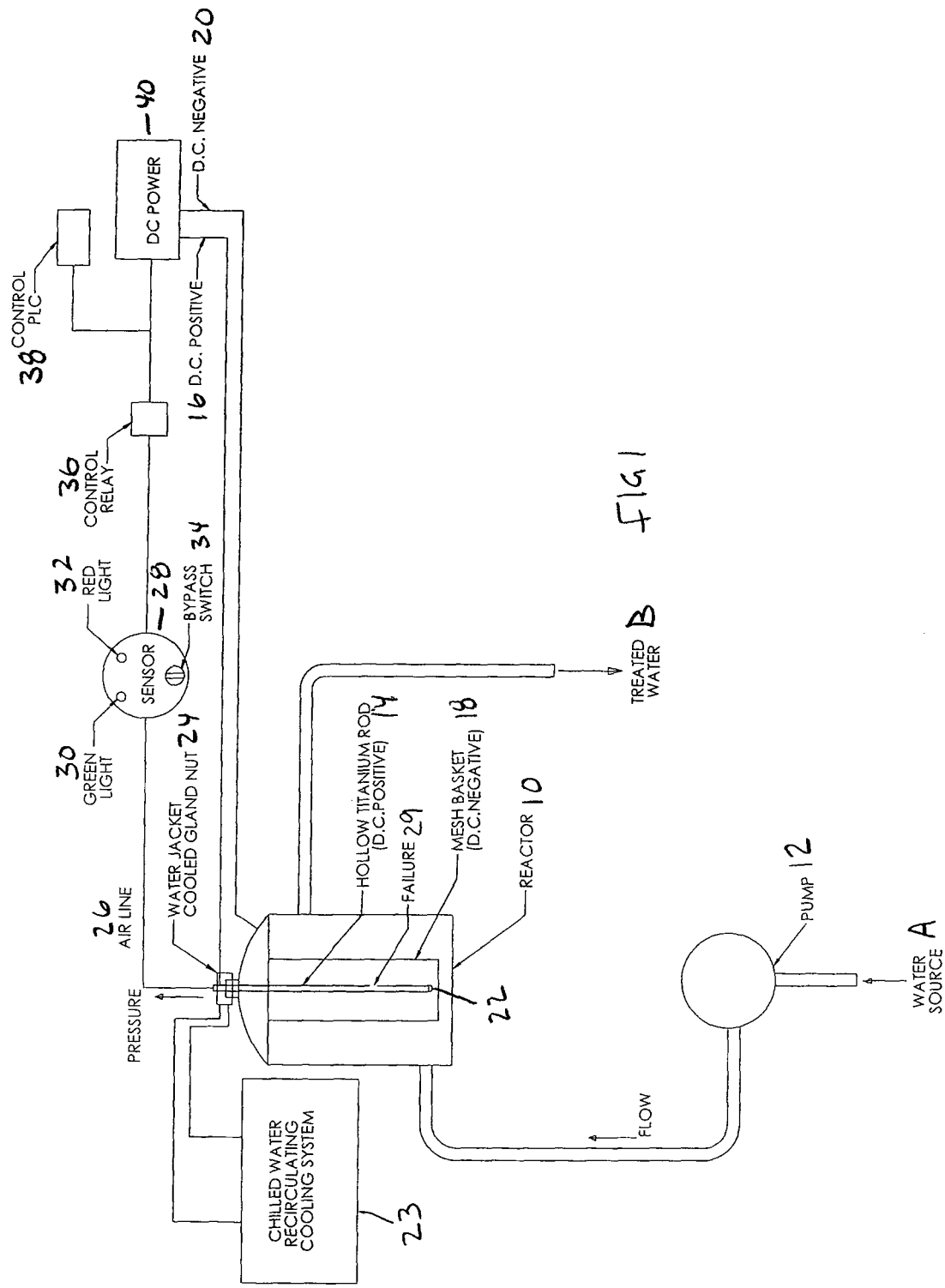
FIG. 1 is a schematic of the pressure anode and monitoring system.
Figure 2:
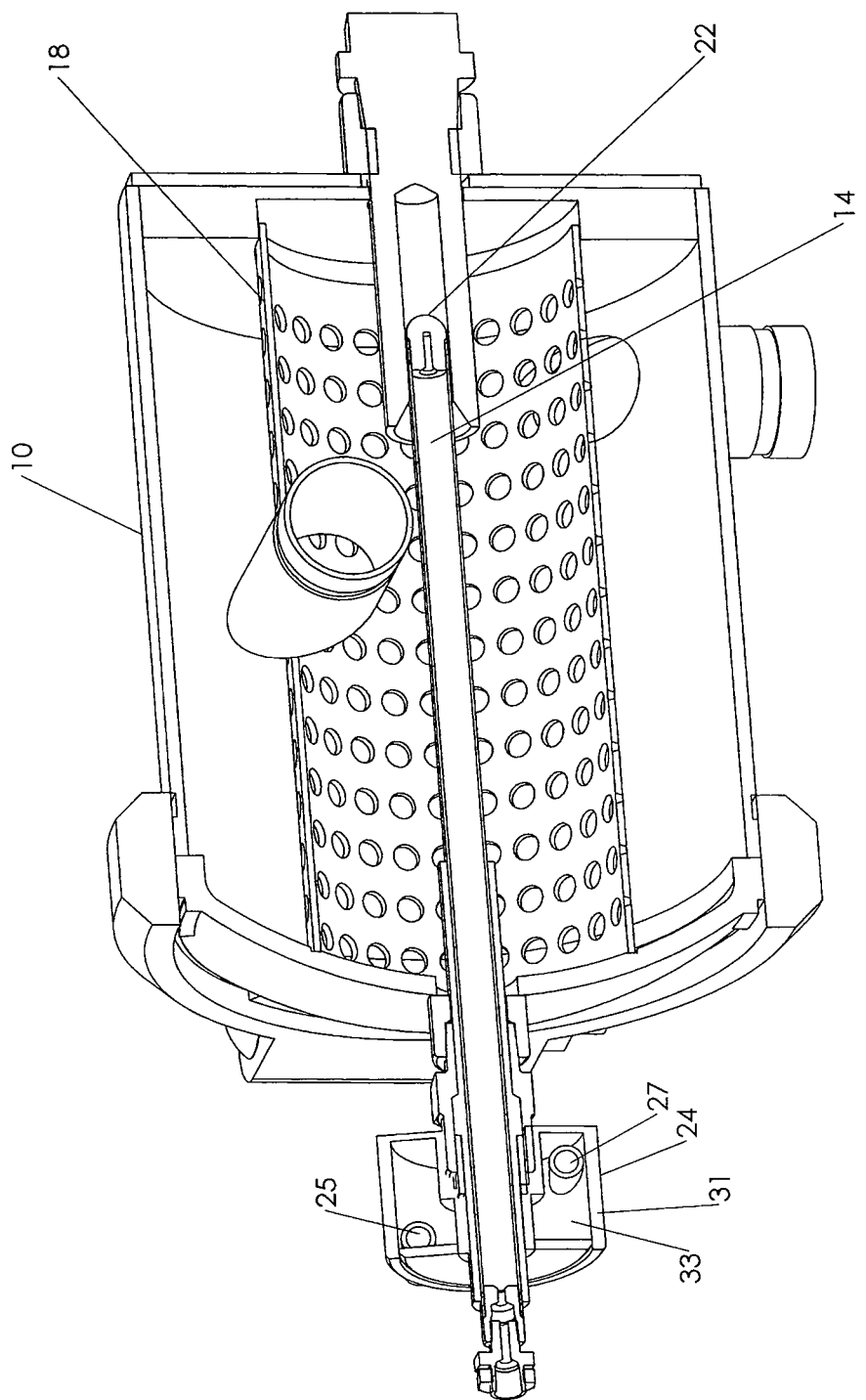
FIG. 2 is a cross sectional view of the reactor tank.
Figure 3:
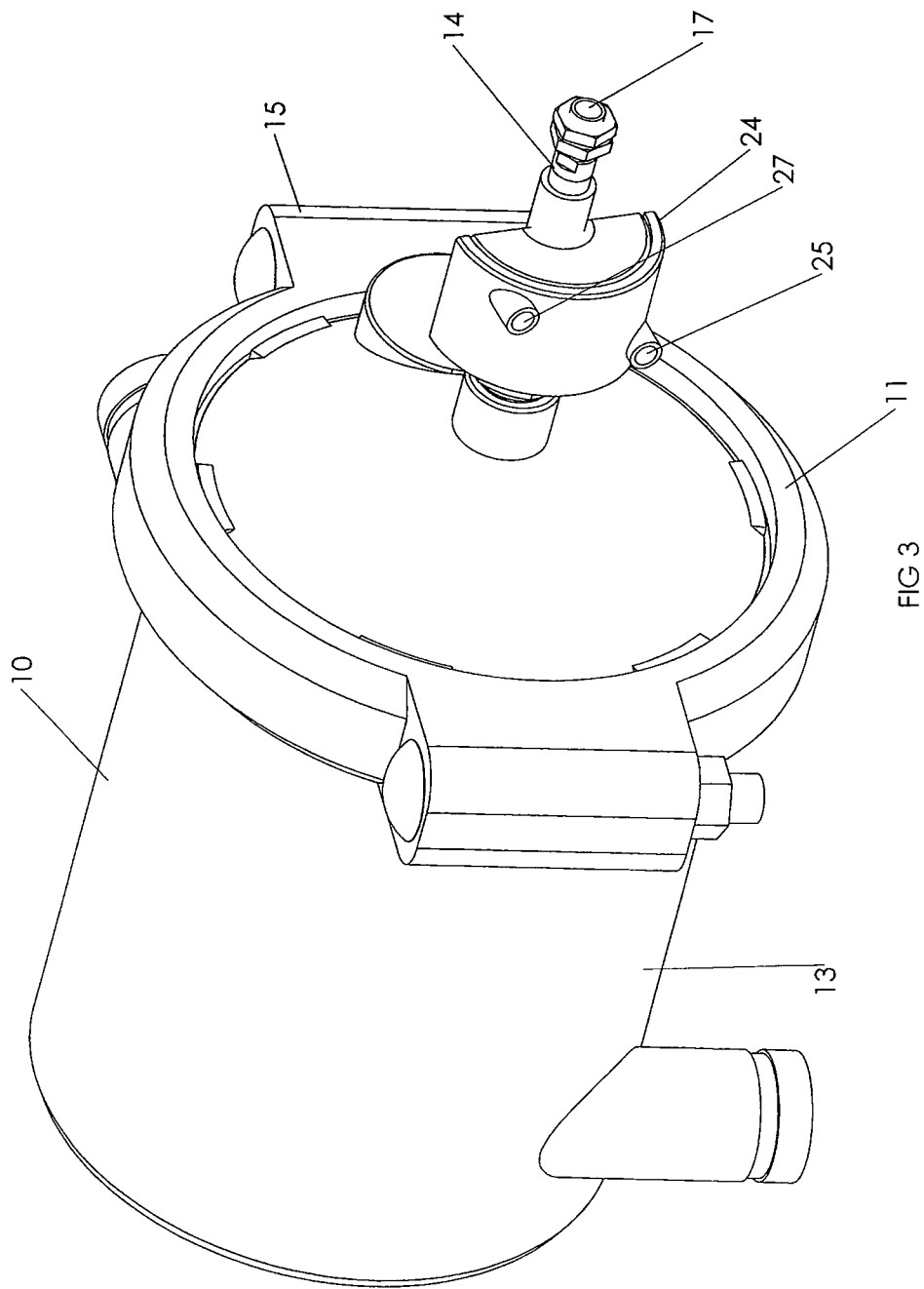
FIG. 3 is a perspective view of the reactor tank.

FIG. 2 is a cross section view of the reactor tank 10 depicting the rod anode 14 centrally disposed within the mesh basket 18. The rod anode 14 is secured to the reactor by the water jacket cooled gland nut 24. FIG. 3 illustrates a reactor tank 10 having with the water jacket cooled gland nut 24 extending from a cover 11. The cover 11 is coupled to the reactor base 13 by a removable flange 15. The rod anode 14 is electrically secured to the power source attachment nuts 17.

The invention works under as control system for checking the integrity of a rod anode 14 having an interior chamber 15 comprising: installing the rod anode 14 in a reactor tank 10 for use in treating fluid "A"; pressurizing the interior chamber 15 of the rod anode 14 with a fluid, either a gas such as air line 26 or a liquid such as water; energizing the rod anode with D.C. positive current 16 from a D.C. power source 40; monitoring the pressure of the interior chamber 15 with a sensor 28; and deenergizing the rod anode 14 if the pressure falls below a predetermined level. The predetermined level can measured in psi or mmHG, depending if pressure or vacuum is being measured.

The control system checks the integrity of a rod anode by pressurization through the following steps: installing a rod anode in a reactor tank used in treating fluid with a high voltage direct current power source; applying pressure to the interior chamber of said rod anode; monitoring the pressure of said interior chamber of said rod anode; energizing said rod anode with the power source; illuminating a first indicator light if the pressure within said rod anode remains above a first predetermined level; illuminating a second indicator light if the pressure within said rod anode falls below the first predetermined level; and disconnecting the power source to said rod anode if the pressure falls below a second predetermined level.

Alternatively, the control system can be used for checking the integrity of a rod anode by vacuum comprising the steps of installing a rod anode in a reactor tank used in treating fluid with a high voltage direct current power source; drawing a vacuum on the interior chamber of said rod anode; monitoring the vacuum drawn of said interior chamber of said rod anode; energizing said rod anode with the power source; illuminating a first indicator light if the vacuum stays beneath a first predetermined level; illuminating a second indicator light if the vacuum within said rod anode raises above the first predetermined level; and disconnecting the power source to said rod anode if the vacuum raised above a second predetermined level.

The control system described above allows integrity checking of the rod anode by either gas, liquid or vacuum. A step of overriding the disconnecting step can take place if the vacuum within the rod anode changes from the second predetermined level or, when used with liquid or air pressure, the pressure falls beneath the second predetermine level.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A control system for checking the integrity of a rod anode comprising:
   installing a rod anode having an interior chamber in a reactor tank used in treating fluid with a high voltage direct current power source;
   applying pressure to the interior chamber of said rod anode;
   monitoring the pressure of said interior chamber of said rod anode;
   energizing said rod anode with the power source;
   illuminating a first indicator light if the pressure within said rod anode remains above a first predetermined level;
   illuminating a second indicator light if the pressure within said rod anode falls below the first predetermined level; and
   disconnecting the power source to said rod anode if the pressure falls below a second predetermined level.

2. The control system according to claim 1 including the step of mounting said rod anode in a reactor tank with a gland nut having a water jacket secured to a recirculating chilled cooling system.

3. The control system according to claim 2 including the step of overriding the disconnecting step if the pressure within the rod anode falls below the second predetermined level.

4. The control system according to claim 1 wherein said rod anode is titanium.

5. The control system according to claim 1 wherein the pressure is applied in the form of a gas.

6. The control system according to claim 1 wherein the pressure is applied in the form of a liquid.

7. A control system for checking the integrity of a rod anode having an interior chamber comprising:
   installing said rod anode in a reactor tank used for treating fluid with a high voltage direct current power source;
   monitoring the interior chamber of said rod anode;
   pressuring the reactor chamber;
   energizing said rod anode with said power source;
   illuminating a first indicator light if the interior chamber of said rod anode remains at a first predetermined pressure level;
   illuminating a second indicator light if the interior chamber of said rod anode alters from the first predetermined pressurize level; and
   disconnecting said power source to said rod anode if pressure within said interior chamber of said rod anode approximates a second predetermined pressure level.

8. The control system according to claim 7 including the step of mounting said rod anode in a reactor tank including a gland nut having a water jacket secured to a recirculating chilled cooling system.

9. The control system according to claim 7 including the step of bypassing the disconnecting step if the pressure within the rod anode approximates the second predetermined level.

10. The control system according to claim 7 wherein said rod anode is titanium.

* * * * *